United States Patent [19]
Huang

[11] Patent Number: 6,117,247
[45] Date of Patent: Sep. 12, 2000

[54] ALOE VERA GEL EXTRACTING APPARATUS

[76] Inventor: Xiaozhou Huang, No.103, the 5th Building, Lianhuabeicun, Shenzhen, Guangdong Provice, P.R.C. 518026, China

[21] Appl. No.: 09/221,549

[22] Filed: Dec. 28, 1998

[51] Int. Cl.$^7$ ...................................................... B26D 7/01
[52] U.S. Cl. ............................................. 127/24; 83/865
[58] Field of Search ................................ 127/24; 83/865; 99/541, 589

[56] References Cited

U.S. PATENT DOCUMENTS

| | | | |
|---|---|---|---|
| 3,878,197 | 4/1975 | Maret | 260/236.5 |
| 4,591,387 | 5/1986 | DeGray | 127/24 |

*Primary Examiner*—David Brunsman
*Attorney, Agent, or Firm*—Patterson & Keough, P.A.

[57] ABSTRACT

The present invention relates to an aloe vera gel extracting apparatus, which consists of a body, a transmission system, a peeling device and a driving mechanism, characterizing in that transmission system comprises an upper and a lower part, with the upper part of the system connected to the body through the belt sheave axle at the right end and the belt sheave axle at the left end connected to the hanger trestle in synchronons vertical movement with it, and the lower part of the system connected to the body at both ends through the sheave axles respectively. The peeling device consists of an edge cutting blade and a peeling blade, wherein the edge cutting blade is set in the slot between the two groups of belt, the upper peeling blade is connected to the hanger trestle and the lower peeling blade is connected direct to the body. The device of the present invention is capable of producing complete bars of aloe vera gel. It is simple-structured, convenient for use and efficient in operation.

4 Claims, 2 Drawing Sheets

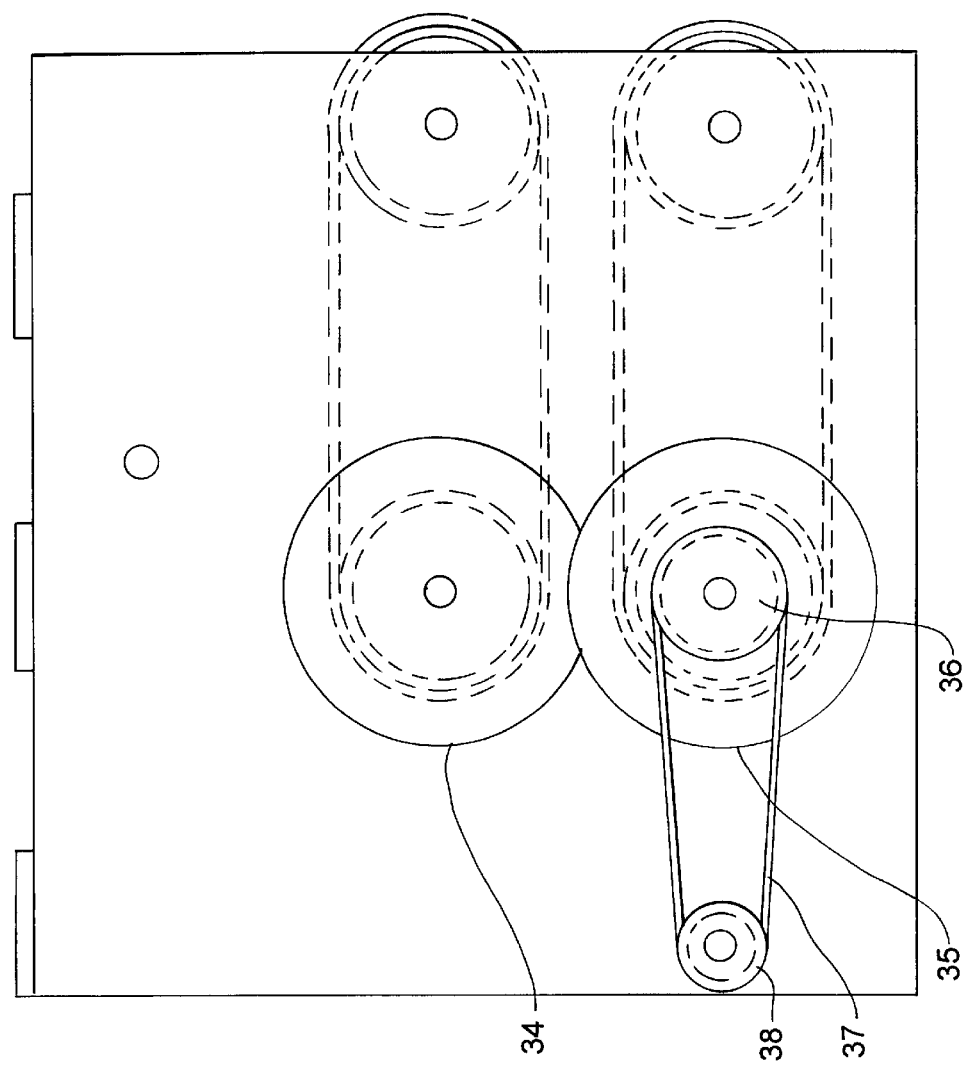

ALOE VERA GEL EXTRACTING APPARATUS

The present invention relates to a leaf blade processing device, particularly to an aloe vera gel extractor.

Aloe is a kind of glutinons plant which has a crisp leaf epidermis underneath which is gelati-like gel. The leaves are thin at the tip and thick at the bottom with a roughly crescent-like cross section, shown in FIG. 4. Therefore, the processing of the aloe involves great trouble. As far as the applicant knows, the conventional processing methods usually take the form of artificial peeling or artificial peeling after the aloe is congealed, which inconveniences the operation and produces a low effect, furthermore, these methods lead to energy waste as well.

The object of the present invention is to provide an aloe vera gel extactor which is simple in structure, convenient for use, efficient in operation, and able to obtain a complete gel bar from the aloe.

The object of the present invention is achieved through the following method. It consists of a body, a belt transmission system, a peeling device and a driving mechanism wherein said belt transmission system is made up of two parts with the upper part comprising a belt, a belt sheave, a belt sheave axle, a hanger trestle, a seat, a pressure adjusting rod and a distance adjusting rod, and the lower part comprising a belt, a belt sheave and a belt sheave axle, wherein.

The upper part of said transmission system is connected to the body through the belt sheave at the right end and to the hanger trestle through the belt sheave axle at the left end, and wherein.

The lower part of said transmission system is connected to the body tbrough the belt sheave axle at both ends.

The peeling device of the present invention consists of a left and a right edge cutting blade and an upper and a lower peeling blade, wherein the left and right edge cutting blades are fruit-peeler-shaped, with one end fixed on the body and the other end extending through the slot between the upper and lower belts under its elasticity, the upper peeling blade is connected to the hanger trestle, with a fixed distance between the edge and the belt and in joint vertical movement with the hanger trestle, and the lower peeling blade is in direct connection to the body, the direction of the movement of its edge opposite to that of the belt.

The advantages of the present invention are that the extractor not only has a high efficiency but can obtain a complete gel bar from the aloe by removing only the epidermis of -the leaves according to their different shapes and that it is simple in structure, convenient for operation and secure for use.

Below is a detailed description of the present invention with reference to the drawings.

BRIEF DESCRIPTION OF THE DRAWINGS

FIG. 2 is a cross-section along line A—A of FIG. 1;

FIG. 3 is a rear view of FIG. 1; and

As shown in FIGS. 1–3, the present invention consists mainly of a body, two belt transmission systems, a peeling device and a driving mechanism, wherein the specific components are a body 1, a hanger trestle 2; a pressure adjusting rod 3, a spring 4 and 5, a hut 6 and 7, a seat 8, a distance adjusting rod 9, a nut 10, 11 and 12, a seat axle 13, abelt sheave 14, 15, 16 and 17, a belt sheave axle 18, 19, 20 and 21, a belt 22 and 23, an edge cutting blade 24 and 25, an upper peeling blade 26, a bolt 27, a lower peeling blade 28, a ball-bearing 29 and 30, a dross groove 31, 32 and 33, a gear 34 and 35, a V belt pulley 36, a triangle belt 37, a V belt pulley 38, an adjustable-speed motor 39, and a feeding rack 40.

Figure 1:
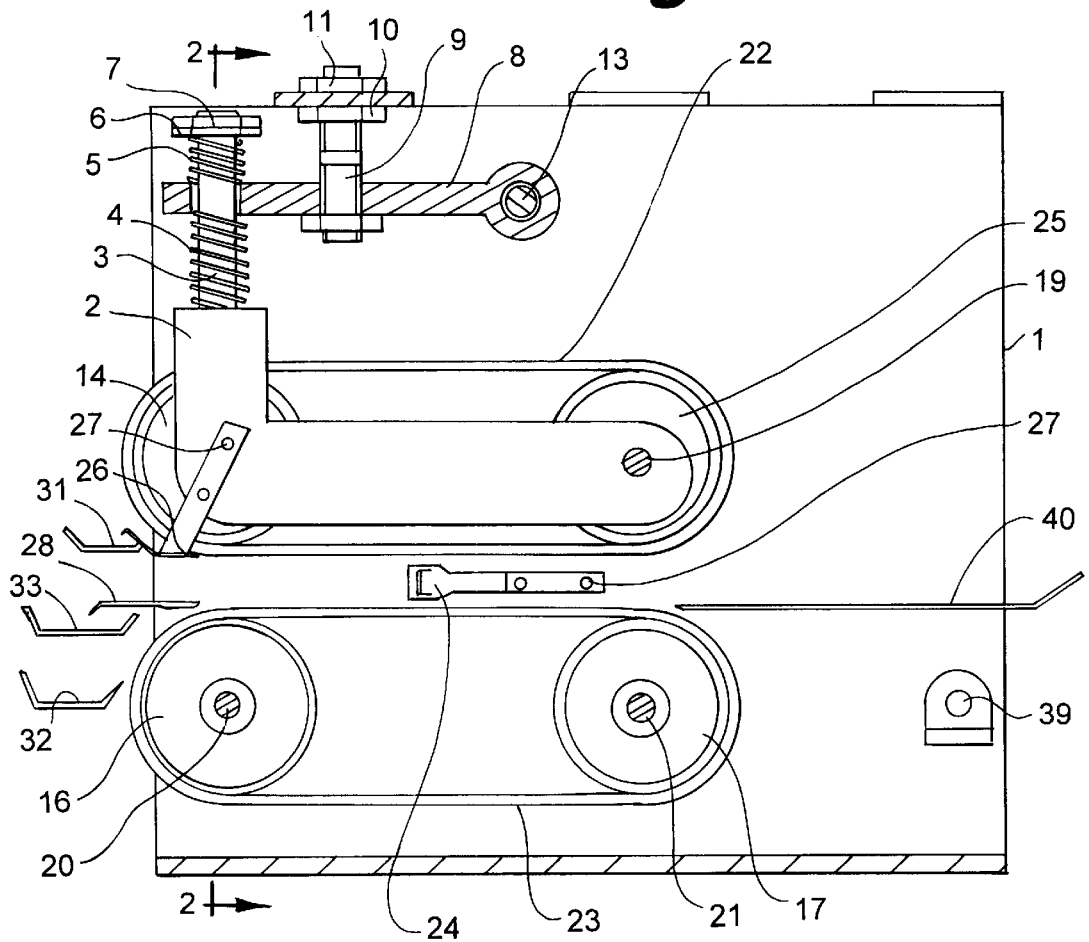
FIG. 1 is a section view showing the structure of the present invention.
Figure 4:
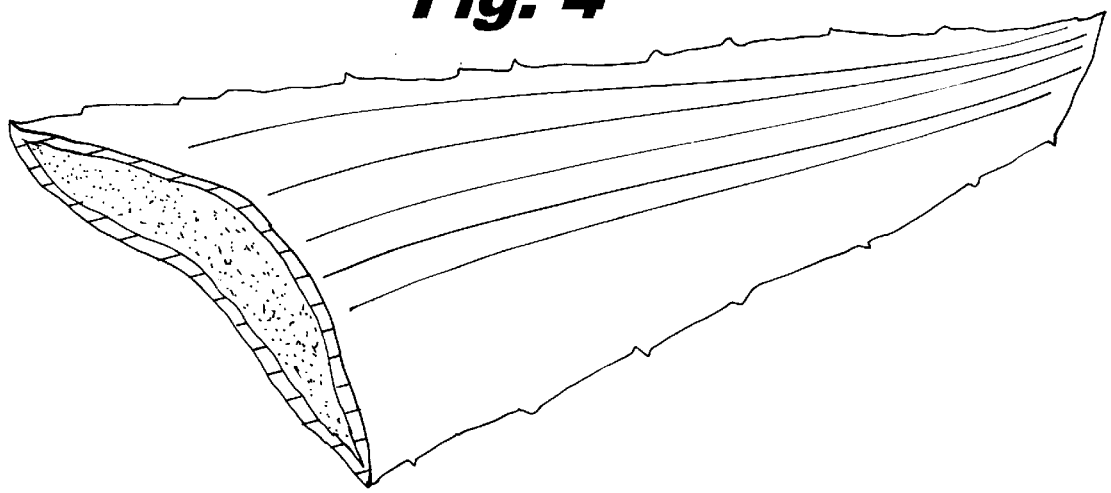
FIG. 4 is a diagram showing the shape of the aloe leaf.

The belt transmission system of the present invention further comprises an upper and a lower part, wherein the upper part consists of a belt 22, a belt sheave 14 and 15, a belt sheave axle 18 and 19, a seat 8, a pressure adjusting rod 3 and a distance adjusting rod 9. The right end of the system is connected to the body 1 through a belt sheave 19, and the left end to the hanger trestle 2 through a belt sheave axle 18. The lower part of the belt transmission system mainly comprises a belt 23, a belt sheave 16 and 17 and a belt sheave axle 20 and 21, with both ends connected to body 1 through belt sheave axles 20 and 21 respectively. The peeling device mainly consists of a left and a right edge cutting blade 24 and 25 and an upper and or lower peeling blade 26 and 28 and their correspondent connectors. The edge cutting blades are made of stainless steel alloy plate with good elasticity and they resemble a fruit-peeling knife in apperance, with one end fixed on the body 1 and the other extending along the solt between the two groups of belt under its elasticity. The upper peeling blade 26 is connected to the hanger trestle 2, with a fixed distance between its edge and the belt 22 and in joint up-and down movement with the hanger trestle 2. The lower peeling blade 28 is in direct connection with the body 1, with its edge in opposite direction of movement to the belt and a fixed distance from the belt. Said driving mechanism consists of an adjustable motor 39 and its coaxial V belt pulley 38, triangle belt 37, V belt pulley 36 and its coaxial gear 35, gear 34, belt 22 and 23, and belt sheave 14,15, 16 and 17.

The working principles of the present invention are as follows.

1. The belt sheave driving mechanism and the V belt pulley 38 coaxial with the adjustable-speed motor 39 actuates the gears 35 and 34 through the V belt pulley 36 of the triangle belt 37, setting the upper and lower belt systems in synchronousoperation, with the direction of movement of the opposing side in conformity with that of the leaf.

2. The process of the movement of the leaf is as such: The screw nuts 10 and 11 of the distance adjusting rod 9 and the nuts 6 and 7 of the pressure adjusting rod 3 force the aloe leaf blade into the slot between the upper and lower belts, and when one third of the length enters the slot, the beaf blade receives the squeeze from above and beneath and is conveyed along the belt under the squeezing force of the belts and is gradually squeezed into regular shapes. As a result of the springs 4 and 5, the upper and lower belts can exert on the leaf blade a predestined pressure regardless of the thickness of the leaf blade and assures the fact that when the leaf blade passes through the axial line of the belt sheaves 14 and 16, its cross section will be regularly rectangular.

3. The peeling process: When one third of the length of the leaf blade enters the slot between the two groups of belt, it is then held by the upper and lower belts and conveyed along. In this movement, as the edge cutting blades 24 and 25 resemble the shape of a fruit peeler, a certain thickness of the epidermis of the leaf blade will be cut off by blades in certain shapes regardless of the thickness of the leaf, and the leaf blade whose edge has been cut moves further to the line between the belt sheaves 14 and 16 and its cross section is approximately square. As the peeling blades 26 and 28 are placed nearest to the line, the epidermis is peeled off by the lower peeling blade 28 and dropped into the dross groove 32 when the leaf passes the line, meanwhile, the upper epidermis of the leaf is peeled off by the upper peeling blade 26 and dropped into the dross groove 31, thus the leaf processing procedure is finished when at last the aloe vera gel (i.e.,the aloe leaves which are peeled off) drops into the dross groove 33 in bars.

What is claimed:

1. An aloe vera gel extracting apparatus, which comprises a body, a belt transmission system, a peeling device and a driving mechanism, characterizing in said transmission system consists of an upper and a lower part, wherein the upper part includes a belt (22), a belt sheave (14) and (15), a belt sheave axle (18) and (19), a hanger trestle (2), a seat (8), a pressure adjusting rod (3) and a distance adjusting rod (9), and the lower part includes a belt (23), a belt sheave (16) and (17) and a belt sheave axle (20) and (21).

2. An aloe vera gel extracting apparatus according to claim 1, characterizing in: the transmission system is connected to body (1) through the belt sheave axle (19) at the right end of the upper part, and its left end is connected to the hanger trestle (2) through the belt sheave axle (18) and in synchronous vertical movement with the trestle (2).

3. An aloe vera gel extracting apparatus according to claim 1, characterizing in: the lower part of the belt transmission system is fixed to the body (1) at both ends through the belt sheave axles (20) and (21).

4. An aloe vera gel extracting apparatus according to claim 1, characterizing in : said peeling device consists of a left and a right edge cutting blade (24) and (25), an upper and a lower peeling blade (26) and (28), wherein the left and right edge cutting blades resemble the shape of a fruit peeler, with one end fixed on the body (1), and the other end extending is the slot between the two groups of belt above and beneath. The upper peeling blade (26) is connected to the hanger trestle (2), its edge at a fixed distance from the belt (22) and moving up and down synchronously with the hanger trestle (2). The lower peeling blade (28) is in direct connection with the body (1), with its edge in oppsite moving direction to the belt (23).

* * * * *